FIG. I.

_United States Patent Office_

3,425,301
Patented Feb. 4, 1969

3,425,301
EPICYCLIC HELICAL GEARBOXES
James Forrest Shannon, Cheshire, England, assignor to Associated Electrical Industries Limited, London, England, a British company
Filed Aug. 8, 1966, Ser. No. 570,791
Claims priority, application Great Britain, Aug. 10, 1965, 34,223/65
U.S. Cl. 74—801    10 Claims
Int. Cl. F16h 57/04, 1/42

ABSTRACT OF THE DISCLOSURE

An epicyclic gearing having a split annulus, the ring gears forming the two parts whereof are resiliently mounted for radial and torsional flexibility and with means for supplying oil under pressure between the facing surfaces of the two ring gears.

---

This invention relates to an improved epicyclic helical gearbox in which the annulus gear consists of two separate helically toothed ring gears disposed axially adjacent to one another.

A conventional epicyclic gearbox consists of three main components including a sun gear, an internally toothed annulus gear mounted in a gearbox housing, and a carrier having three or more planet gears which mesh with both the sun gear and the annulus gear. Torque is transmitted to and from the gear box by means of shafts which are connected to two of these three main components.

Small inherent inaccuracies in the methods of making these gears prevent the gears from running absolutely truly, and this effect is aggravated as a result of the combined meshing of the sun gear, the planet gears and the annulus gear. One method of accommodating these small errors to allow the sun gear to float in both radial and axial directions so as to automatically ensure equal load distribution between the planet gears, and splitting the annulus into two separate ring gears which are resiliently mounted for limited radial and rotary movement relative to each other.

An object of the present invention is to provide an epicyclic helical gearbox with means which facilitate limited radial and rotary relative movement between two resiliently mounted halves of a split annulus.

This object could be achieved by mounting one or two rubber shear pads between facing surfaces of the two resiliently mounted halves of a split annulus. Each pad being attached to at least one of these facing surfaces.

According to the present invention, however, an epicyclic gearbox having a helically toothed annulus gear which comprises two internally toothed co-axial ring gears, of which at least one of the ring gears is resiliently mounted for limited radical and rotary movement relative to the gearbox housing, has an abutment member adjacent each such relatively movable ring gear, facing planar surfaces being formed perpendicular to the axis of the ring gears on each such relatively movable ring gear and its adjacent abutment member, respectively, and means being provided for supplying a hydrostatic oil film between each pair of facing planar surfaces.

In one form of gearbox made in accordance with the invention each one of the ring gears is resiliently mounted so that it is capable of limited radial and rotary movement relative to both the gearbox housing and an adjacent abutment member.

The provision for the said limited radial and rotary movement may be made by mounting resilient means, such as "C-springs," radially between the gearbox housing and each ring gear capable of radial and rotary movement relative to the gearbox housing.

Throughout this specification, the term "C-spring" is used to denote a slotted tube-like part having a horseshoe shaped cross-section which, except for a circumferential gap corresponding to the slot in the part, is annular in shape. A plurality of such C-springs may be mounted with their axes parallel to the axis of the gearbox in complementary grooves formed on an inner surface of the gearbox housing and an outer surface of each resiliently mounted ring gear.

In order to further improve the facility of load distributing movement, further resilient means may be mounted axially between each resiliently mounted ring gear and the member which supports this ring gear against axial movement under load. These further resilient members may consist of a plurality of axially extending springs angularly spaced around the axis of the gearbox.

Another method of improving the facility of load distributing movement is to provide a coating of friction reducing material, such as polytetrafluoroethylene, between each resiliently mounted ring gear and the member which restrains this ring gear against axial movement under load.

In one embodiment of the invention, the teeth of one of the ring gears are of oppositely disposed obliquity to the teeth of the other ring gear so that the annulus is in the form of a double helical gear. In this embodiment, one or both ring gears may act as the member which restrains the other ring gear against axial movement under load.

In another embodiment of the invention, the teeth of one of the ring gears are of the same obliquity as the teeth of the other ring gear so that the annulus is in the form of a single helical gear. In this case, one of the ring gears may act as the member which restrains the other ring gear against axial movement under load.

The invention will now be described, by way of example, with reference to FIGURES 1, 2, 3, 4A, 4B and 5 of the accompanying drawings in which like parts have been assigned like reference numerals, and:

Figure 1:
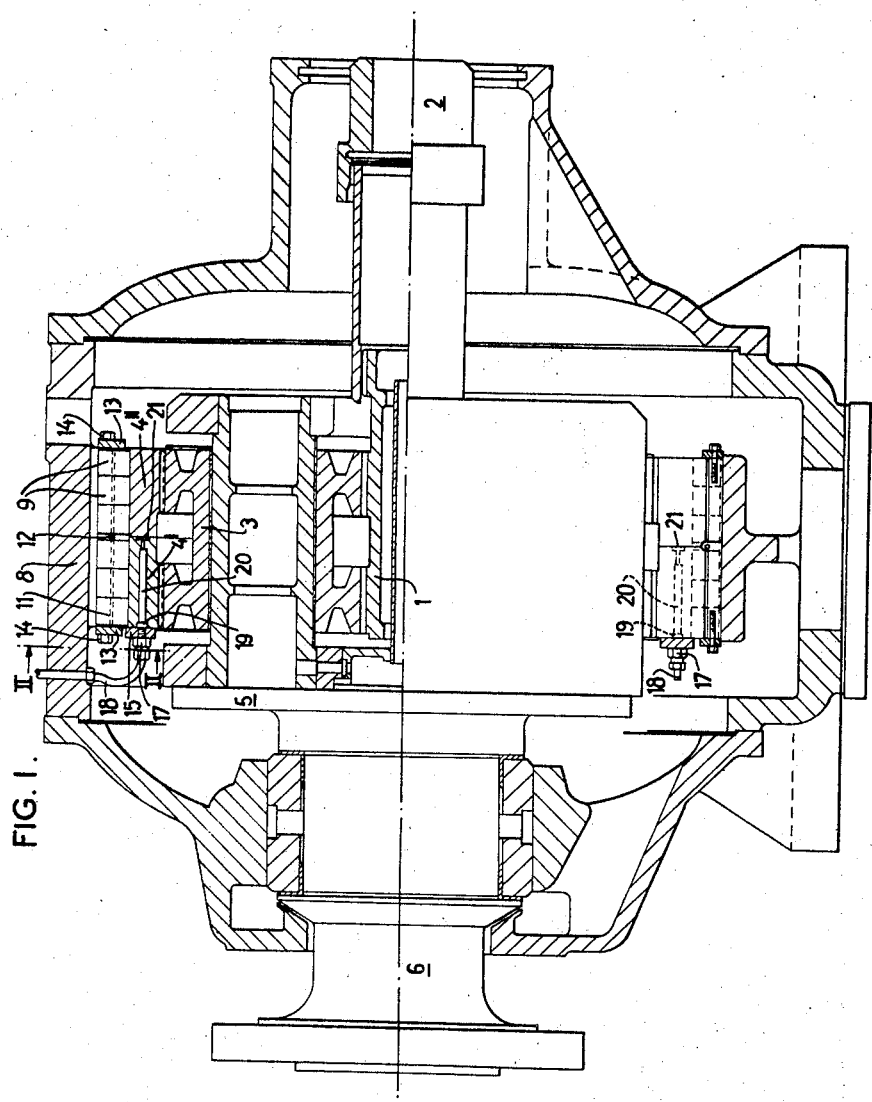
FIGURE 1 is a sectional elevation of an epicyclic reduction gearbox having double helical gears with some lines removed for clarity.
Figure 2:
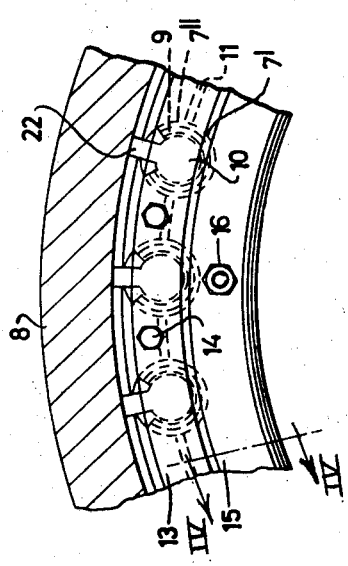
FIGURE 2 is a sectional end elevation of part of the gearbox, across the line II—II in FIGURE 1.
Figure 3:
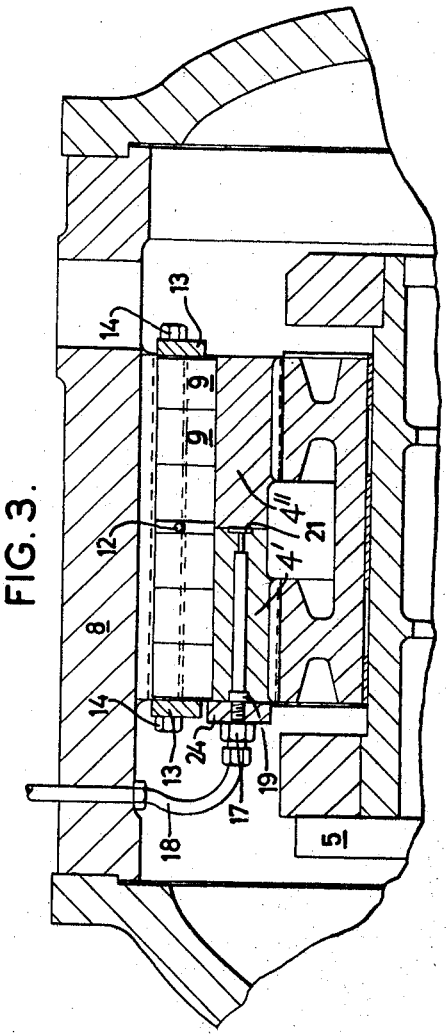
Figure 4A:
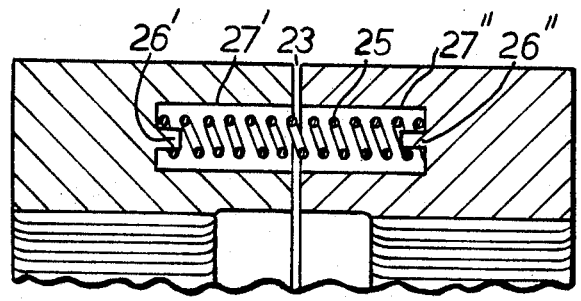
Figure 4B:
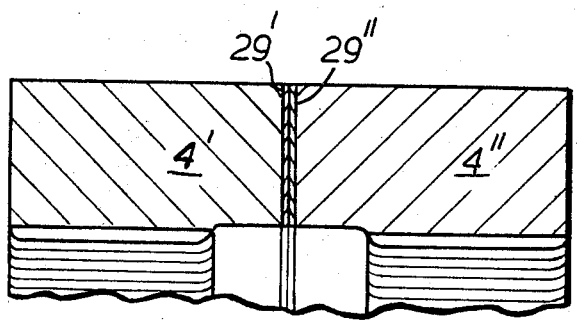

FIGURE 3 is a sectional elevation of part of an epicyclic reduction gearbox similar to the one shown in FIGURE 1, but having gears with helical teeth of the same obliquity rather than double helical teeth; and FIGURES 4A and 4B are part sectional elevations of the ring gears shown in FIGURES 1 and 2 taken across the line IV—IV in FIGURE 2. FIGURE 4A shows an arrangement in which axially extending springs are mounted between the ring gears so as to assist in maintaining a clearance 23 between the ring gears 4' and 4", FIGURE 4B shows the alternative arrangement in which the abutting surfaces of the ring gears are provided with a coating of polytetrafluoroethylene.

Figure 5:
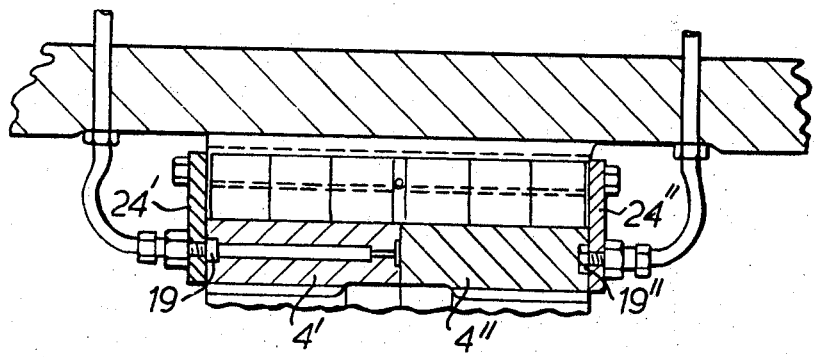

FIGURE 5 is a sectional elevation similar to FIGURE 3, but showing an arrangement for a reversing gearbox.

Referring now to FIGURES 1 and 2, a double helical sun gear 1 (only partly shown) is driven by a high speed shaft 2, and meshes with three, or more, double helical planet gears, one of which (3) is shown in section. The planet gears, in turn, mesh with a double heilcal annulus which consists of two ring gears 4' and 4" having teeth of oppositely directed obliquity, respectively. The planet gears are mounted on a carirer 5 which drives a low speed shaft 6.

Complementary grooves 7' and 7" of semi-circular section are formed around an outer surface of the annulus and an inner surface of the gearbox housing, respectively.

C-springs 9, each of which consists of two concentric circular tube-like elements are mounted radially between the ring gears and the gearbox housing, six to each pair of complementary grooves. Each tube-like element of a C-spring has a longitudinally extending slot which is aligned with the slot of the other concentric tube-like element of the C-spring so that the C-spring may be mounted on a key member 10 one of which is fitted in a complementary key-way 22 formed in each of the grooves 7". As the resiliently mounted ring gears 4' and 4" are separated from the gearbox housing by a radial clearance 11, they are capable of limited independent radial and rotary movement. The C-springs supporting each of the ring gears are separated by a snap ring 12, mounted in a groove formed in the inner surface of the gearbox housing, and are restrained with the ring gears, against axial movement, by annular strips 13' and 13", fastened to the gearbox housing at each end of the grooves 7" by means of bolts 14.

Another annular strip 15 is fastened to the ring gear 4' by means of bolts 16, and threaded fittings 17 convey oil under pressure from an oil supply line 18 to an annular groove 19 formed in the outer end surface of ring gear 4'. From the annular groove 19 the oil passes along axial passages 20, spaced around the ring gear 4', to oil chamber 21 which feeds oil to the interface between the abutting ring gears 4' and 4". Thus the two ring gears float relatively to each other on a hydrostatic oil film. In this embodiment, the direction of rotation and the obliquity of the teeth formed on each of the ring gears 4' and 4" is such that each ring gear acts as an axially abutting member which supports the other ring gear, against axial movement, on a hydrostatic oil film.

FIGURE 4A shows one of a series of angularly spaced pairs of axially aligned holes 27' and 27" formed in the abutting faces of the ring gears 4' and 4". In each of these pairs of holes a compression spring 25 is mounted at its ends on projections 26' and 26". The holes 27' and 27" being of slightly larger diameter than the spring 25 to allow movement of the ring gears relative to each other.

FIGURE 4B shows polytetrafluoroethylene layers 29' and 29" formed on the abutting surfaces of the ring gears 4' and 4".

In each of the embodiments shown in FIGURES 4A and 4B the means for supplying a hydrostatic oil film between the resiliently mounted ring gears enable radial movement of the ring gears relative to each other and the various alternative means shown are provided to further facilitate this movement.

Another embodiment envisaged by the invention includes the use of ring gears having split herringbone gear teeth in which the reverse direction of rotation or obliquity of the teeth cause the ring gears to be thrust apart during operation. As shown in FIGURE 5, in this case the annular strips 13 and 15 are replaced by annular thrust pads 24' and 24" which are fastened to the gearbox housing, respectively at each end of the annulus. Such a case arises in the operation of a reversing epicyclic gearbox, and maens are provided for separating each ring gear from its restraining thrust pad by means of a hydrostatic oil film.

Referring now to FIGURE 3, both of the ring gears 4' and 4" are formed with helical teeth of the same obliquity so that during operation both the ring gears are thrust to the left, the left hand ring gear 4' taking the thrust of the right hand ring gear 4" and the thrust pad 24 taking the combined thrust of the two ring gears 4' and 4". In this case the annular strip 15 (shown in FIGURE 1) is replaced by a thrust pad 24 which is fastened to the gearbox housing to restrain the ring gears against axial movement. Except for the fact that two helical gears having teeth of the same obliquity are used rather than double helical gears, the remainder of the gearbox is essentially the same as described with reference to FIGURE 1, and pressurised oil in annular groove 19 and chambers 21 produce hydrostatic oil films which separate ring gear 4' from ring gear 4", and ring gear 4' from thrust pad 24.

If the gearbox were reversing a further similar thrust pad 24 would be required at the other end on the annulus (as shown in FIGURE 5).

In the above arrangements the variation in the thickness of the hydrostatic oil film, as a result of the relative axial movements of the ring gears to accommodate manufacturing errors and to effect evenness of load distribution, is not sufficient to cause excessive oil leakage.

What I claim is:

1. An epicyclic gearing comprising: a housing, a split annulus comprising a pair of coaxially mounted, internally toothed ring gears, a sun gear, planet gears mounted on a carrier and engaging both the sun gear and the ring gears, resilient support members extending between the outer periphery of the ring gears and the surrounding housing and allowing each ring gear freedom for limited radial and circumferential movement relative to the housing, and independent of the other ring gear, transverse facing surfaces on the adjoining ends of the ring gears and means for supplying a hydrostatic oil film between the said transverse facing surfaces, said oil supply means comprising oil supply ducting communicating with the facing surfaces.

2. An epicyclic gearing as claimed in claim 1 wherein the ring gears have oppositely sloped teeth to form a split herringbone toothed gear, and wherein the said oil supply ducts extend axially through at least one of the split ring gears, and including an annular manifold supplying said axial ducts.

3. An epicyclic gearing as claimed in claim 1 comprising coatings of low friction material on at least one of said facing surfaces of the ring gears.

4. An epicyclic gearing as claimed in claim 1 wherein the toothed ring gears have similarly sloped teeth, a thrust resisting member engaging the side of the ring gear receiving the axial thrust from the other ring gear, facing transverse surfaces on the thrust resisting member and the ring gear, and means for supplying oil under pressure between the last said surfaces to form a hydrostatic oil film therebetween.

5. An epicyclic gearing according to claim 4, having further resilient means mounted between each such relatively movable ring gear and its adjacent abutment member.

6. An epicyclic gearing according to claim 5, wherein the further resilient means consist of a series of axially extending springs angularly spaced around the axis of the ring gears.

7. An epicyclic gearing according to claim 6, having a layer of low friction co-efficient material on at least one of said facing planar surfaces.

8. An epicyclic gearing according to claim 7, wherein the low friction co-efficient material is polytetrafluoroethylene.

9. An epicyclic gearing comprising: a housing, a split annulus comprising a pair of coaxially mounted, internally toothed ring gears, a sun gear, planet gears mounted on a carrier and engaging both the sun gear and the ring gears, said ring gears having oppositely sloped teeth to form a split herringbone toothed gear, resilient support members extending between the ring gears and the surrounding housing and allowing each ring gear freedom for limited radial and circumferential movement relative to the housing and independent of the other gear, additional resilient members tending to force the ring gears apart axially, transverse facing surfaces on the adjoining ends of the ring gears, means for supplying oil under pressure to the facing surfaces, said oil supply means comprising oil supply ducts communicating with the facing surfaces.

10. An epicyclic gearing as claimed in claim 9 comprising: axial thrust members limiting movement apart of said ring gears, facing surfaces on each thrust member and the associated ring gear and means for forcing oil under pressure between each of the last said pairs of facing surfaces.

References Cited

UNITED STATES PATENTS

| | | | |
|---|---|---|---|
| 1,217,427 | 2/1917 | Fast | 74—801 |
| 2,690,685 | 10/1954 | Donandt | 74—801 |
| 3,090,258 | 5/1963 | Zink et al. | 74—801 |
| 3,206,993 | 9/1965 | Niemann | 74—801 X |
| 3,258,995 | 7/1966 | Bennett et al. | 74—801 |

ARTHUR T. McKEON, *Primary Examiner.*

U.S. Cl. X.R.

74—410